United States Patent [19]
Johnson et al.

[11] Patent Number: 6,063,899
[45] Date of Patent: May 16, 2000

[54] APPARATUS AND METHOD FOR EXTRACTING PLASTICIZER

[75] Inventors: Lonnie Johnson, Smyrna; John M. Baxley, Dunwoody, both of Ga.; Timothy J. Stachoviak, Waunakee, Wis.

[73] Assignee: Johnson Manufacturing LLC, Smyrna, Ga.

[21] Appl. No.: 09/094,824

[22] Filed: Jun. 15, 1998

[51] Int. Cl.⁷ ........................................ C08F 6/00
[52] U.S. Cl. ........................ 528/482; 429/124; 429/126; 429/137; 429/192; 429/194
[58] Field of Search ................... 429/137, 192, 429/194, 126, 124; 528/482

[56] References Cited

U.S. PATENT DOCUMENTS

| | | | |
|---|---|---|---|
| 4,550,064 | 10/1985 | Yen et al. | 429/94 |
| 4,994,335 | 2/1991 | Kamaei et al. | 429/254 |
| 5,219,680 | 6/1993 | Fauteux | 429/192 |
| 5,227,264 | 7/1993 | Duval et al. | 429/153 |
| 5,260,148 | 11/1993 | Idota | 429/198 |
| 5,350,645 | 9/1994 | Lake et al. | 429/124 |
| 5,387,479 | 2/1995 | Koksbang | 429/126 |
| 5,426,006 | 6/1995 | Delnick et al. | 429/218 |
| 5,427,872 | 6/1995 | Shen et al. | 429/142 |
| 5,478,364 | 12/1995 | Mitate et al. | 29/623.5 |
| 5,478,673 | 12/1995 | Funatsu | 429/197 |
| 5,498,489 | 3/1996 | Dasgupta et al. | 424/152 |
| 5,512,389 | 4/1996 | Dasgupta et al. | 429/192 |
| 5,540,741 | 7/1996 | Gozdz et al. | 29/623.5 |
| 5,571,634 | 11/1996 | Gozdz et al. | 429/192 |
| 5,607,485 | 3/1997 | Gozdz et al. | 29/623.5 |
| 5,677,083 | 10/1997 | Tomiyama | 429/194 |
| 5,686,201 | 11/1997 | Chu | 429/52 |
| 5,691,047 | 11/1997 | Kurauchi et al. | 428/315.7 |
| 5,702,845 | 12/1997 | Kawakami et al. | 429/224 |
| 5,705,292 | 1/1998 | Yukita et al. | 429/137 |
| 5,714,277 | 2/1998 | Kawakami | 429/62 |
| 5,731,104 | 3/1998 | Ventura et al. | 429/188 |

*Primary Examiner*—Terressa Mosley-Boykin
*Attorney, Agent, or Firm*—Kennedy, Davis & Hodge, LLP

[57] ABSTRACT

An apparatus and method for extracting plasticizer from polymer structures includes, in one embodiment, a vacuum chamber, a heating member and a condenser, the plasticizer being vaporized from the polymer structure by a combination of low temperature and heat, and in another embodiment, an evaporation chamber, a conveyer belt, and a plasticizer removal system, the plasticizer removal system including a duct having mounted therein a heating member, a fan and a condenser so that plasticizer may be extracted by forced air convection.

15 Claims, 7 Drawing Sheets

APPARATUS AND METHOD FOR EXTRACTING PLASTICIZER

BACKGROUND OF THE INVENTION

Solid-state secondary lithium ion batteries are constructed from polymeric electrodes bonded to current collectors and separated by a polymeric separator.

The anode of a lithium ion battery may be constructed from a carbonaceous material. These carbonaceous materials can reversibly accept and donate significant amounts of lithium. Examples of suitable carbonaceous materials include synthetic and natural graphite, petroleum coke and doped coke. The anode may be constructed from transition metal compounds having layered structures into which lithium ions can be intercalated and deintercalated during charge and discharge. These cells are referred to as rocking chair cells. The rocking chair compounds have electrochemical potentials close to that of lithiated carbon and different from the transition metal oxides frequently used for cathodes. Examples of suitable rocking chair anode compounds are $Li_xWO_2$, $Li_xMoO_2$ and $Li_xTiS_2$.

Transition metal oxides are preferred for lithium ion battery cathodes. Li ions can be inserted into and extracted from these intercalating compounds with little or no structural modification of the compound. Examples of suitable transition metal oxides for cathode construction include $LiCoO_2$, $LiNiO_2$ and $LiMn_2O_4$.

Anode and cathode active materials are often formed into anode and cathode structures by binding the active materials in a polymer film or sheet. U.S. Pat. Nos. 4,980,250, 5,219,680, 5,340,670, 5,380,606, 5,426,006, 5,582,931, 5,584,893, 5,643,695 and 5,656,393, incorporated herein by reference, disclose compositions for Li ion cathodes and anodes and methods of making these electrodes. Once the polymer films containing the electrode active materials have set, the electrodes, separator and collectors are generally laminated by heat and pressure.

The separator must provide sufficient insulation between electrodes to prevent the formation of an electrical circuit which causes a short, while at the same time being permeable to migrating lithium ions. Separators have been constructed of very thin sheets of polymer. The polymer matrix may be composed of olefin, polyvinyl alcohol, polyvinylidene difluoride and associated copolymers and the like. Alternatively, a preformed porous woven or nonwoven polymer mat may be utilized as a separator.

The electrolyte of lithium ion batteries consists of a lithium salt in a nonaqueous solvent. Typical lithium salts include $LiPF_6$, $LiAsF_6$, $LiBF_4$, $LiClO_4$, $LiN(CF_3SO_2)_3$ and $LiN(SO_2C_2F_5)_3$. A nonaqueous environment is maintained in Li ion batteries because lithium and its salts are notoriously reactive in aqueous solutions. Aprotic organic solvents such as propylene carbonate or ethylene carbonate are commonly used. Lithium salts readily disperse in these solvents. Other solvents are tetrahydrofuran, 1,2-dimethoxyethane, dimethyl carbonate, diethyl carbonate, and diethoxyethane. The polymer separator, of course, must be stable to the solvent selected. For a discussion of conventional solvent/lithium solute systems, see S. Hossain, "Rechargeable Lithium Batteries (Ambient Temperature)", in *Handbook of Batteries and Fuel Cells*, D. Linden, Ed., McGraw-Hill, 2nd Ed., 1995, incorporated herein by reference.

An important aspect of the formation of separate or composite electrode and separator polymeric sheets is that the polymer be porous so that is may absorb the electrolyte and also to facilitate ion movement during charging and discharging. It is known in the art to utilize small, organic molecules such as plasticizers to render the polymer porous. For examples of patents disclosing the use of plasticizers in the formation of solid state lithium ion battery components see U.S. Pat. Nos. 5,418,091, 5,460,904, 5,540,741 and 5,552,239, incorporated herein by reference.

In general, the plasticizer is mixed with solvent, polymer, and other electrode or separator materials to form a slurry which is cast into a polymer sheet by means such as a Doctor blade. The slurry is allowed to cure, forming a polymer sheet. The separate electrode and separator polymer sheets are then laminated. Before further processing of the laminated structures, it is often desirable to remove the plasticizer to create a "dry" laminated structure.

Various methods of removing plasticizer are known in the art. U.S. Pat. Nos. 5,418,091 and 5,460,904 disclose the use of solvents such as diethyl ether to extract the plasticizer from the battery structures. In that method, the plasticizer containing battery components are washed with a compatible solvent which leaches the plasticizer without damaging or otherwise affecting the polymer. U.S. Pat. No. 5,552,239 discloses the use of supercritical fluid extraction to remove plasticizer. Supercritical fluid extraction utilizes an easily condensed gas such as carbon dioxide as a solvent at a temperature above its critical point.

These methods of plasticizer extraction have several inherent problems. Solvent extraction requires the use of expensive, flammable chemicals which may be damaging to the environment. In order to recycle the plasticizer, it must be distilled from the solvent. Supercritical fluid extraction has the advantage of low solvent cost and low toxicity. However, expensive equipment is required.

What is needed in the art is an apparatus and method for removing plasticizer not only from solid state secondary lithium ion batteries, but from other polymeric structures as well. The method should use low cost equipment, be performed in the absence of solvents, and allow recovery of the plasticizer in a form which can be readily and easily recycled.

SUMMARY OF THE INVENTION

During the manufacture of many polymer containing materials, and particularly solid state lithium ion battery separators and electrodes, it is desirable to include plasticizers so that the components will be rendered porous. Porosity facilitates the saturation of the components with electrolyte and encourages free migration of ions between the electrodes during successive cycles of charging and recharging. It is known in the art to extract plasticizers from battery components with solvents or by supercritical fluid extraction. Solvent extraction is time consuming and requires the use of sometimes dangerous, environmentally unfriendly solvents. Supercritical fluid extraction requires complex, expensive machinery.

Therefore, it is an object of the present invention to provide an efficient and safe method and apparatus for removing plasticizer from plasticizer containing polymer structures.

It is further an object of the present invention to provide a method and apparatus for removing plasticizer from a plasticizer containing polymer by vaporization through a combination heat and low pressure.

It is another object of the present invention to provide a method and apparatus for removing plasticizer from a plasticizer containing polymer by evaporation facilitated by exposure of the polymer to heat and air currents.

In a preferred embodiment, an apparatus for removing plasticizer from a polymer sheet is provided. The apparatus comprises a cylindrical chamber having an axis, an inner surface, and an outer surface. A heating member is mounted in the cylindrical chamber parallel to the chamber axis and includes two side members and a bottom member. Together these define a rectangular slot for containing the polymer sheet. Preferably, the heating member is heatable to a predetermined temperature. The apparatus also includes a cooling chamber for containing a coolant, the cooling chamber surrounding and enclosing the cylindrical chamber so that the coolant contacts the outer surface of the cylindrical chamber and causes cooling the inner surface of the cylindrical chamber to cooled. The apparatus also includes a vacuum connected to the cylindrical chamber so that the cylindrical chamber may be depressurized and so that the combination of heat and reduced pressure causes the vaporization of the plasticizer from the polymer sheet, the vaporized plasticizer then condensing on the cooled inner surface of the cylindrical chamber and removed via a spigot.

In another embodiment, an apparatus for removing plasticizer from a polymer sheet includes an elongate chamber having an inner surface and an outer surface; a radiant heating member, the heating member mounted in the chamber so that the surface of the polymer sheet may be heated; and a cooling coil, the cooling coil surrounding the chamber and contacting the outer surface of the chamber, so that the outer surface and inner surface of the chamber may be cooled to a predetermined temperature. The apparatus further includes a vacuum connected to the cylindrical chamber so that the chamber may be depressurized, the combination of heat and reduced pressure causing the vaporization of the plasticizer from the polymer sheet, the vaporized plasticizer then condensing on the cooled inner surface of the chamber and removable via a spigot.

In another embodiment, an apparatus for removing plasticizer from a polymer structure includes a cylindrical member, the cylindrical member having an axis, an air inlet opening and an air outlet opening; at least one radiant heat source mounted in the cylindrical member, so that the polymer sheet may be heated to a predetermined temperature; and a fan for providing air flow through the cylindrical member, the fan having an axis coincident with the cylindrical member access, the fan rotatable about the fan axis so that air is drawn from outside the cylindrical member, through the air inlet opening, across the surface of the polymer sheet, and exits through the air outlet opening, the combination of heat and air flow causing vaporization and removal of the plasticizer from the polymer sheet.

In another embodiment, an apparatus for removing plasticizer from a polymer structure includes a vaporizing chamber, the vaporizing chamber including an air inlet, an air outlet, a conveyor inlet opening, and a conveyor outlet opening; a continuous conveyor belt, the conveyor belt extending through the conveyor inlet opening into the interior of the chamber and extending out of the chamber through the conveyor outlet opening; and a plasticizer removal mechanism, the plasticizer removal mechanism including a duct communicating with the air inlet and the air outlet. The duct has an axis and includes a heating member mounted in the duct, a fan mounted in the duct, the fan having an axis parallel to the duct access, the fan rotatable about the fan axis, and a condenser coil, the condenser coil mounted in the duct and being coolable to a predetermined temperature, the heating member, fan, and condenser coil arranged within the duct so that air is forced by the fan through the heating member causing the air to be heated, the air then continuing through the duct into the chamber, the heated air causing vaporization of the plasticizer from polymer sheets conveyed into the chamber by conveyer belt, the vaporization forming plasticizer-enriched air, the plasticizer-enriched air exiting the chamber through the air outlet opening into the duct, the plasticizer-enriched air then contacting the condenser coil and the plasticizer condensing on the condenser coil to remove the plasticizer from the plasticizer-enriched air, the air then recycled by the fan through the heating coil and continuing another cycle.

The present invention also provides a method for removing plasticizer of a particular boiling point from a polymer containing plasticizer. The method comprises heating the polymer containing plasticizer to a predetermined temperature and vaporizing the plasticizer by exposure to a vacuum of sufficiently low pressure so that the boiling point of the plasticizer is reduced below the predetermined temperature. The predetermined temperature is greater than about 150 degrees Fahrenheit, preferably greater than about 180 degrees Fahrenheit, and most preferably greater than about 210 degree Fahrenheit and the vacuum applied is greater than about 27 inches of mercury.

Another embodiment of the method for removing plasticizer from a polymer structure containing plasticizer comprises heating the polymer structure to a predetermined temperature and exposing the polymer to a flow of air, so that the plasticizer evaporates from surfaces of the polymer. The predetermined temperature is about greater than 150 degrees Fahrenheit, preferably greater than about 180 degrees Fahrenheit, and most preferably about greater than 210 degrees Fahrenheit and the air flow is about greater than 0.2 miles per hour. Alternatively, the air flow is sufficient to cause evaporation of plasticizer from the polymer surfaces.

Another embodiment of the method for removing plasticizer from a polymer containing plasticizer comprises exposing surfaces of the polymer to a flow of heated air so that the polymer is heated to a predetermined temperature and so that the plasticizer evaporates from the polymer surfaces. Preferably, the predetermined temperature is about less than 150 degrees Fahrenheit and the air flow is about greater than 0.2 miles per hour. Alternatively, the air flow is sufficient to cause evaporation of plasticizer from the polymer surfaces.

DESCRIPTION OF THE PREFERRED EMBODIMENT

Figure 1:
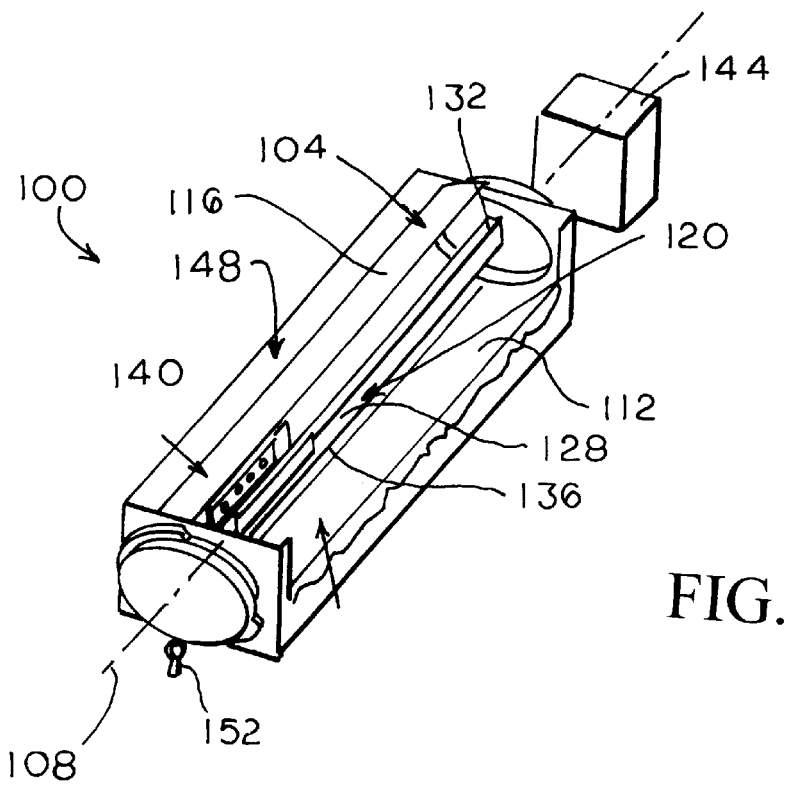
FIG. 1 is a schematic drawing of an apparatus for removing plasticizer from a polymer by conductive heat transfer coupled with a vacuum.

Manufacturing strategies are known in the art for causing the anode, cathode, and separator elements in solid state lithium ion batteries to be permeable to electrolyte, so that ions can flow freely back and forth between the electrodes in successive charging and discharging cycles.

Electrodes in solid state lithium ion batteries are fabricated from lithium compounds dispersed in thin-layer, porous polymeric sheets. Typically in a solid state lithium ion battery, the cathode is a dispersed lithiated metal oxide with or without a binder. Examples include LiMO where MO is Co, Ni, Mn, or V metal oxides of appropriate valence. Conventional methods of manufacturing cathodes are disclosed in U.S. Pat. Nos. 5,296,318, 4,550,064, 5,260,148, 5,518,842 and 5,380,606 hereby incorporated by reference.

Anodes in solid state lithium ion batteries are typically carbonaceous, comprised of various forms of synthetic or natural graphite, petroleum coke or doped coke. Lithium ions are intercalated into the carbonaceous material to yield $LiC_6$ (graphite) or $LiC_{12}$ (coke). U.S. Pat. No. 5,219,680 discloses a method for making such an electrode by entrapping amorphous carbon in a polymeric premix followed by in situ polymerization around a metallic collector element. U.S. Pat. No. 5,514,490 discloses an unusual anode utilizing a layered titanium phosphate followed by intercalation of Li. A further type of anode material useful with the present separator is a noncrystalline carbon having low density, and a particular Raman spectrum, as disclosed in U.S. Pat. No. 5,401,598. A preferred carbonaceous or other lithium intercalation anode material is compacted graphite dispersed in a porous polymeric matrix. The anode may also include rocking chair compounds, for example $Li_xWO_2$, $Li_xMoO_2$ and $Li_xTiS_2$ and the like. The foregoing patents are hereby incorporated by reference.

For the purpose of this application, electrode active materials include carbonaceous lithium ion intercalating materials, lithiated metal oxides, and rocking chair anode compounds. Lithiated metal oxides include $LiCoO_2$, $LiNiO_2$, $LiMn_2O_4$, and the like. Further cathode and anode materials are described in detail in Hossain, supra.

Separators utilized in the present invention may simply comprise a porous polymer matrix providing sufficient separation between electrodes to prevent the formation of a circuit which causes a short circuit of the battery. This polymer matrix may be composed of olefin, polyvinylidene difluoride and its associated copolymers, polyvinyl alcohol and the like.

Preferably, the separator consists of two parts, an inner core matrix of a fibrous homopolymer, embedded in a sheet of porous elastic polymer. The core matrix is a fabric-like composite manufactured in pre-formed rolls by several vendors such as Web Dynamics and Hollingsworth/Vose. These materials are made of minute polymer fibers, finely comminuted into fibers about 0.1 micron in diameter to about 1.5 microns in length. Structurally the matrix fibers are deposited randomly to create very small pores throughout the fabric body. These matrices may be manufactured by deposition of fibers in the desired thickness onto a running conveyor track, and compressed under rollers into sheets in a process similar to paper manufacture. Alternatively, the fiber sheets may be melt blown. The resultant fiber matrix is preferably 0.75 to 5.0 mils in thickness and has a density of between 15 and 50 grams/sq. meter. Finer materials may be obtained by custom manufacture. Since it is desirable to reduce the ion path between electrodes to every extent, the custom materials will have a target thickness of less than 0.75 mils with a slight increase in density. It is only in the present process, which permits complete saturation of the fiber vacuoles with plastic, that the thickness of the fibrous core and the overall separator can be reduced to 1.75 to 3.00 mils overall without strength failure.

The homopolymers of the separator fibers are selected from polyethylene, polypropylene, polyvinylalcohol, and the like, manufactured by conventional methods. The fibers are made up of semi-randomly disposed strands of high molecular weight polymer. Combinations of homopolymers may theoretically be employed. The homopolymers, being readily commercially available in pre-formed sheets, have a very low unit cost, and are manufactured according to specifications giving good reproducibility in battery applications. The fiber matrix provides strength and resilience, which may account for its resistance to fracture.

The selection of the elastic polymer is largely dependent upon the composition of the core matrix material. In the situations in which polyethylene or polypropylene fiber is used, a polymeric infusion of polyvinylidene difluoride is preferred. For a polyvinylalcohol core, a water compatible interpositional material such as Kynar® Latex milk (Elf-Atochem) or a teflon dispersion such as Dupont T-30 is preferred. The fundamental requirement is that the elastic polymer sheet formed after vacuum diffusion be porous, or be capable of being rendered porous, to permit ion transport. Typically, the polymer, which is a powder, is dispersed in an organic solvent such as acetone. A plasticizer is added, the viscosity is adjusted by curing at room temperature or slightly elevated temperatures at 40°–60° C., and the mixture is applied to the fibrous core, as follows:

The fibrous core is placed on a vacuum table and vacuum is applied to the core side face down on the table. A laterally moving casting block is filled with the polymeric mixture and applied to the upper surface by spreading at the desired thickness. The vacuum continues to be applied until all of the solvent has been drawn off. The vacuum is released, the fibrous core fabric is inverted so that the vacuum side is now exposed, and the vacuum process is repeated with the casting block. Multiple thin coatings may be applied, and result in a smoother, more uniform coating.

In this process, the polymeric mixture is pulled by the vacuum into the fibrous core matrix, completely filling the interstitial void spaces. The proportion of solvent is large enough (greater than 20 percent by volume), so that when the polymer fronts advancing through the fibrous core meet and overlap, the residual solvent reliquifies the surrounding polymer, and when dried of the solvent, forms a continuous, unitary polymeric sheet in which the fibrous core matrix is embedded. There are no true layers of polymer on the fibrous matrix, the interfaces between the advancing polymer boundaries having merged to lose completely any independent identity. The resulting structure is very pliant, translucent, and smooth, but extraordinarily strong.

The overall thickness of the separator is important because it defines the path length from one electrode to the other. As pointed out above, custom manufacture can reduce the thickness of the matrix. The thickness of polymer remaining on the separator surfaces should be a minimum of about 0.5 mils. Joining of the electrodes, particularly in continuous composite construction, requires about 1.0 mil. In any event, it appears that a more uniform coating is achieved when an excess of polymeric mixture is run onto the matrix surface for distribution by the casting block.

The vacuum table is a flat manifold having a large plurality of holes approximately 1.0 to 5.0 mm in diameter. A fine mesh screen (200×200 mesh) is placed over the manifold to prevent the matrix from being pulled into the holes. A typical vacuum assembly for laboratory scale utilizes a Variac in combination with a vacuum pump fitted with a 1–6 hp motor. An adequate amount of polymeric mixture is achieved when the interstitial spaces of the fiber matrix are saturated with polymeric mixture. Saturation has occurred when the void spaces are completely filled.

On an industrial scale, it may be impractical to apply polymeric mixture to a single flat sheet at a time. The present method is adaptable to preparation of an entire roll of fabric stock by passing the stock through a coating bar, and then infusing the polymeric mixture into the matrix by passing over a vacuum drum, first on one side and then coating again and passing the reverse side over a second vacuum drum. For multiple coatings, a corresponding plurality of drums may be employed.

Application of coating may be effected by any conventional method including spreading or casting with a doctor blade, rolling, or controlled spraying. The ratio of ingredients in the coating mixture will affect the porosity and adhesive properties of the coated structure. The ratio of polymer to plasticizer should preferably be on the order of 2:1 to 1:10, and the ratio of polymer/plasticizer to acetone may be between about 1:5 to 2:1 for best results. Ratios are expressed as w/w. Fillers such as $TiO_2$ or $SiO_2$ appear to be unnecessary in the coating to provide material strength.

The secondary battery components that can be used with the composite separator and electrode of the present invention are electrolyte and current collector systems known in the solid state (dry) lithium ion field of battery technology using plastic electrode and separator materials. In the electrolyte solutions, typical lithium salts include $LiPF_6$, $LiAsF_6$, $LiBF_4$, $LiClO_4$, $LiN(CF_3SO_2)_3$, and $LiN(SO_2C_2F_5)_3$. Typical solvent systems for dispersion of the lithium salt include diethyl, ethyl, propyl, or dimethyl carbonate, or mixtures thereof, tetrahydrofuran, 1,2-dimethoxyethane, and other organic solvents in which lithium salts can ionize. In general, solvents of low viscosity are preferred (<0.5 cP at 25 degrees C.), to facilitate ion migration and diffusion. Water adsorption characteristics are important, since lithium salts are highly unstable in aqueous environments. Suitable solvents must have a water content of less than 10 ppm.

The current collector elements useful in the present battery are conventional metals. Preferred collectors are typically perforated or expanded metals with a plurality of minute holes.

Once the separator is manufactured, it serves as the base for forming a laminated electrode separator structure or most preferably, a composite electrode separator structure. The electrodes are comprised of electrode active materials dispersed in a plasticized polymer matrix.

To form a composite electrode separator structure, the electrode active materials are mixed into slurries containing solvent, polymer and plasticizer. In a preferred method, the slurry contains a relatively high percentage of solvent (about 45 to 60 percent by weight.) The slurry further contains about 30 to 50 percent by weight of electrode active material. A cathode slurry can preferably contain about 2 to 10 percent by weight carbon black to improve conductivity. The slurry further may contain plasticizer in a ratio of polymer to plasticizer of about 2:1 to 1:10 by weight. The separate anode and cathode slurries may be referred to collectively as electrode slurries or first and second electrode slurries.

These electrode slurries are applied to the separator, preferably the vacuum coated non-woven polymer mat (polymer saturated separator) described above. Application of the slurry may be accomplished, without limitation, by casting, screen printing, spraying or electrodeposition and the like. The slurries are then allowed to cure. Application of the slurry may be accomplished, without limitation, by casting, screen printing, spraying or electrodeposition and the like.

The bonding process is carried out by curing the electrode slurries in a solvent enriched or charged atmosphere. The solvent enriched or charged atmosphere contains solvent vapor in a concentration higher than is normally found in the atmosphere.

In practice, the separator is preferably immobilized on a solid support capable of drawing a vacuum across its surface, such as a vacuum drum surface or flat-bed vacuum surface. The first electrode slurry is then applied to the first side of the separator forming a separator-first electrode slurry structure. The separator-first electrode slurry structure then is enclosed or partially enclosed in a solvent vapor retention means, such as a box, container or other enclosure allowing the transient formation of a solvent vapor enriched or charged atmosphere. The slurry coated side of the separator is exposed to the interior of the vapor retention means and the non-slurry coated side of the separator is exposed to the outside atmosphere. The slurry coated separator is positioned within the vapor retention means so that the slurry is suspended upside down. As the electrode slurry cures, the evaporated solvent accumulates in the vapor retention means creating a solvent vapor enriched or charged atmosphere. As curing continues, the solvent enriched atmosphere of the container eventually equilibrates with the outside atmosphere as the solvent passes through the forming electrode and separator composite and into the outside atmosphere.

After the first electrode slurry cures, normally about 5 to 30 minutes, the separator-first electrode structure is then immobilized on drum vacuum surface or flat-bed vacuum surface and coated on the second separator side with the second electrode slurry. This structure is then enclosed or preferably partially enclosed in a vapor retention means. The second electrode slurry coated side of the separator-first electrode structure is exposed to the interior of the container, the first electrode side is exposed to the outside atmosphere and the second electrode slurry is suspended upside down from the separator-first electrode structure. The bonding process occurs as above.

The plasticizers of the present invention are non-aromatic, aliphatic diesters of the general formula $R_1OOC(CH_2)_nCOOR_2$ wherein $R_1$ and $R_2$ are methyl-, ethyl-, propyl-, butyl-, or combinations thereof, and n is 1 to about 7. Optionally, lithium salts contained in the electrolyte solution may be included in the polymer, plasticizer, solvent mixture, so that upon removal of the plasticizer in the polymer coating, a uniform dispersal of lithium salts is obtained in situ. Alternatively, any small organic ion with a boiling point below about 350 degrees Fahrenheit may be used to provide porosity to the polymer. Examples of plasticizers include dibutyl phthalate, dimethyl phthalate, diethyl phthalate, tris-butoxyethyl phosphate, propylene carbonate, ethylene carbonate, trimethyl trimellitate, mixtures of these, and the like.

The polymer utilized for the battery components and the plasticizer must be compatible at the temperature used for curing the cast components. By compatible it is meant that the blending of the plasticizer with the polymer results in a homogenous mixture, in which both the plasticizer and the polymer are present in the same phase, preferably the liquid phase. The plasticizer must be capable of uniform micro-dispersion throughout the coating layer and electrode layers, so that upon removal a network of microscopic pores renders the coating ion permeable.

An apparatus 100 for extraction of plasticizer from a polymer utilizing a vacuum, conductive heat transfer, and natural convection is illustrated in FIG. 1. The apparatus 100 comprises a vacuum 102 (not shown) and a cylindrical chamber 104 having an axis 108, an inside surface 112 and an outside surface 116. A heating member 120 is mounted longitudinally within the cylindrical chamber 104. The heating member 120 has an axis 124 (not shown) parallel to the cylindrical chamber axis 108. The heating member 120 includes metallic two side members 128 and 132 and a bottom member 138 defining a rectangular slot 140 for containing a polymer sheet. The heating member 120 is connected to an adjustable energy or heat source 144 of a type known in the art The heat source 144 heats the heating member 120 to a pre-determined temperature. The apparatus 100 also includes a cooling chamber 148 for containing a coolant. The cooling chamber 148 surrounds and encloses the cylindrical chamber 104. The coolant contained in the coolant chamber 148, preferably cold water or dry ice, causes the inside and outside surfaces 112 and 116 of the cylindrical chamber 104 to be cooled. The apparatus further includes a spigot 152 communicating with the cylindrical chamber 104, the purpose of which will be described below.

The cylindrical chamber 104 further includes a vacuum fitting 160 (not shown). The vacuum 102 communicates with the vacuum fitting 160, and thus the cylindrical chamber 104, so that the pressure within the cylindrical chamber 104 may be reduced. Preferably the pressure within the chamber 104 may be reduced to less than 30 inches of mercury.

The polymer sheet, preferably a composite separator and electrode for a solid state lithium ion battery, is placed within a holding assembly (not shown). The holding assembly includes two spaced-apart members. Preferably the holding assembly members provide a balance between heat conduction and uninhibited vapor diffusion from the polymer sheet. The holding assembly side members may be aluminum strips, wire mesh, metal wool, or felt.

In operation, the polymer sheet is placed between the side holding members of the holding assembly and the entire assembly is placed in the heating member slot 140. The heating member 120 is heated, with the heat being conducted from the heating member 120 through the holding assembly and to the polymer sheet. Pressure within the cylindrical chamber 109 is reduced below atmospheric pressure, preferably a vacuum of greater than about 27 inches of mercury is applied. This reduction in pressure causes the boiling point of the plasticizer within the polymer sheet to be lowered below the predetermined temperature. At this temperature and pressure, the plasticizer is vaporized. The vaporized plasticizer then condenses on the cold inner surface 112 of the cylindrical chamber 104, collects within the chamber 104 and is removed via the spigot 152.

Figure 2:
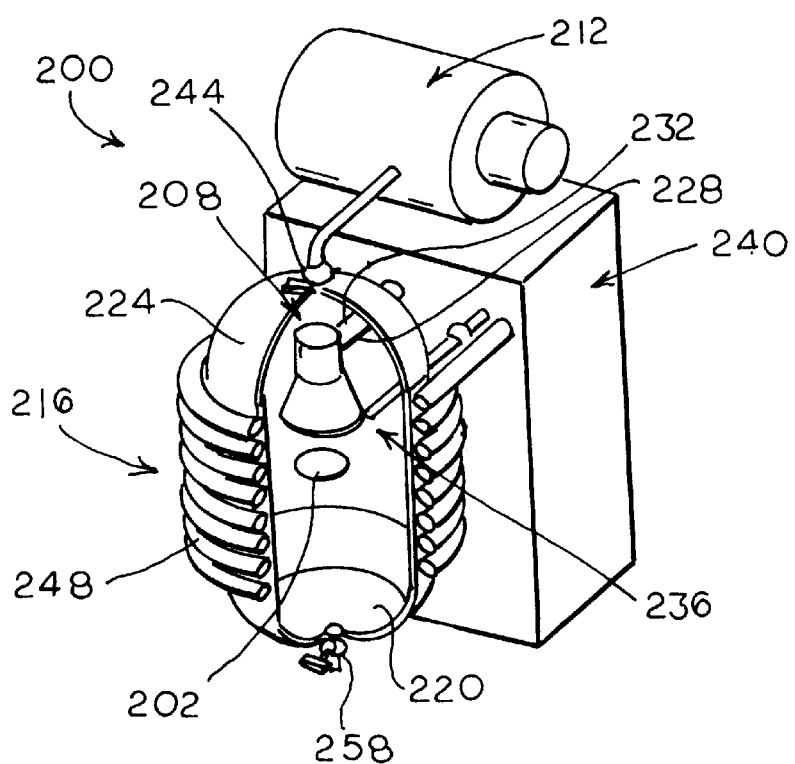
FIG. 2 is a schematic drawing of an apparatus for removing plasticizer from a polymer by radiative heating coupled with a vacuum.

As illustrated in FIG. 2, an apparatus 200 for extracting plasticizer from a polymer structure 202 by application of a vacuum, radiative heat transfer, natural convection includes an elongated vacuum chamber 204, a radiant heat source 208, a vacuum 212 and a cooling mechanism 216. The vacuum chamber 204 has an inner surface 220 and an outer surface 224 and includes mounting extensions 228 and 232 projecting inwardly from the inner surface 220. The radiant heat source 208 is mounted within the vacuum chamber 204 on the mounting extensions 228 and 232 so that the vacuum chamber 204, and thus the polymer structure, may be heated to a predetermined temperature. The vacuum chamber 204 further includes sample mounting extensions (not shown) extending from the inner surface of the chamber. Sample mounting extensions support a platform (not shown), preferably wire mesh, on which the polymer structure may be placed for extraction. The chamber also includes an infrared temperature probe 236 mounted so that the temperature of the polymer may be monitored. The radiant heat source 208 may be any radiant heat source 208 known in the art. Preferably, the amount of heat produced by the heat source 208 may be controlled by a control means 240 connected via a feed-back loop to the infrared probe 236.

The elongated chamber further includes a vacuum fitting 244. The vacuum 212 communicates with the vacuum fitting 244, and thus the vacuum chamber 204, so that the pressure within the vacuum chamber 204 may be reduced. Preferably a vacuum of greater than about 27 inches of mercury is applied.

The cooling mechanism 216 includes heat exchanger coils 248 of types known in the art. The heat exchanger coils 248 contact and surround the outer surface 224 of the vacuum chamber 204 so that the inner surface 220 of the chamber 204 may be cooled to a desired temperature. The apparatus further includes a spigot 258 communicating with the cylindrical chamber 204, the purpose of which will be described below.

In operation, a polymer structure 202 containing plasticizer is placed within the vacuum chamber 204 on the platform. The polymer structure 202 containing plasticizer is heated within the vacuum chamber 204 and a vacuum applied. The combination of heat and low pressure causes the plasticizer to vaporize. The vaporized plasticizer condenses on the cooled inner surface 220 of the vacuum chamber 204. The condensed plasticizer cools within the vacuum chamber 204 and is removed via the spigot 258.

The main parameters for vacuum extraction are the temperature to which the polymer structure containing plasticizer is heated and the pressure within the vacuum chamber. As pressure decreases, the temperature at which the plasticizer vaporizes (the boiling point) decreases. It is necessary that the boiling point be reduced to a temperature lower than temperatures which may damage the polymer structure or cause it to melt. As used herein with respect to vacuum extraction, the term predetermined temperature means the temperature at which the plasticizer will vaporize at a given pressure. Also as used herein with respect to vacuum extraction, the term predetermined pressure means a pressure sufficiently low so that the boiling point of the plasticizer is less than temperature at which the composite separator electrode will melt or otherwise be damaged. Accordingly, it will be recognized by those skilled in the art that the temperatures and pressures which can be utilized for extraction of a particular plasticizer may be varied with respect to each other.

Figure 3:
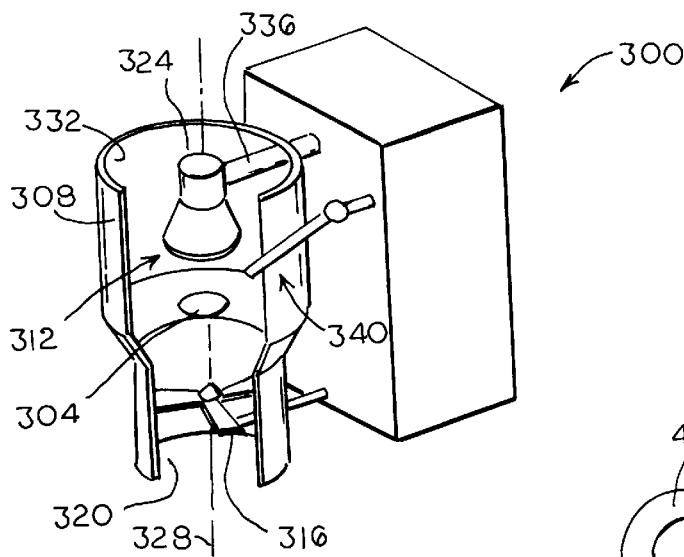
FIG. 3 is a schematic drawing of an apparatus for removing plasticizer from a polymer forced air convection.

As illustrated in FIG. 3, an apparatus 300 for removing plasticizer from a polymer structure 304 by radiative heat transfer and forced convection mass transfer includes a cylindrical member 308, a heat source 312, and a fan 316. The cylindrical member 308 includes an air inlet opening 320, an air outlet opening 324, and has an axis 328 and an inner surface 332. A heat source mounting extension 336 extends inwardly from the inner surface 332. The heat source 312 is mounted within the cylindrical member 308 on the mounting extension 336 so that the plasticizer containing polymer structure 304 may be heated to a predetermined temperature. The cylindrical member 308 further includes sample mounting extensions (not shown) extending from the inner surface 332 of the cylindrical member 308. The sample mounting extensions support a platform (not shown), preferably wire mesh, on which the polymer may be placed for extraction. The cylindrical member 308 also includes an infrared temperature probe 340 mounted so that the temperature of the polymer structure 304 may be monitored. The radiant heat source 312 may be any radiant heat source known in the art. Preferably, the amount of heat produced by the heat source 312 may be controlled by a control means 344 connected via a feed-back loop to the infrared probe 340.

The fan 316 is also mounted within the cylindrical member 308, the fan having an axis (not shown) coincident with the cylindrical member axis 328. As the fan 316 rotates about its axis, air is drawn in through the inlet opening 320 and across the surface of the polymer structure 304. The turbulent air flow created at the surface of the polymer structure 304 causes the evaporation of plasticizer from polymer structure surfaces. The initial evaporation of plasticizer from the polymer structure surfaces causes a diffusion gradient to be formed wherein plasticizer concentrations inside the polymer structure are greater than plasticizer concentrations at the outside surfaces of the polymer structure. The plasticizer inside the cell moves along this diffusion gradient to the polymer surfaces where it is removed by evaporation.

Figure 4:
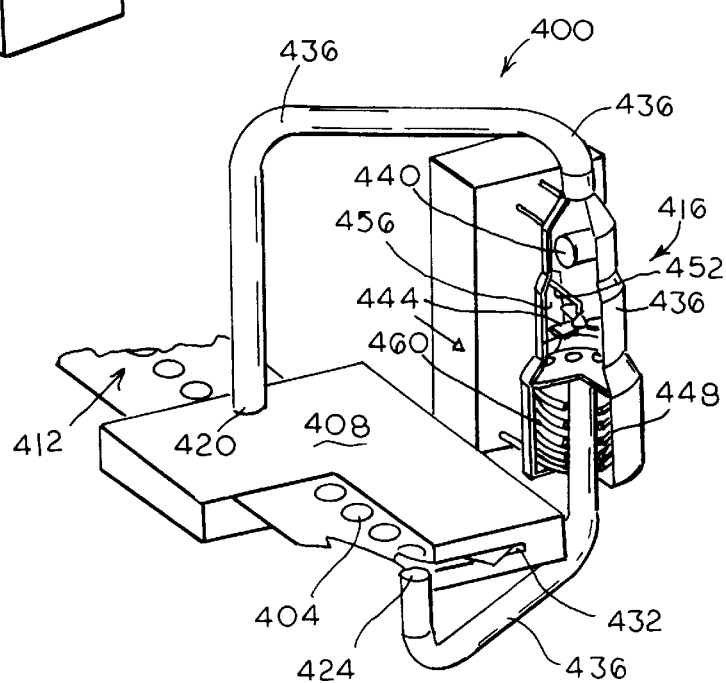
FIG. 4 is a schematic drawing of an apparatus for removing plasticizer from a polymer by forced air convection.

As illustrated in FIG. 4, an apparatus 400 for the forced air convection extraction of plasticizer from polymer structures 404 includes an evaporating chamber 408, a conveyor belt 412, and a plasticizer evaporation mechanism 416. The evaporating chamber 408 includes an air inlet 420, an air outlet 424, a conveyor belt inlet 428 (not shown) and a conveyor belt outlet 432. Preferably, the chamber is configured in such a manner as to ensure the turbulent flow of air within the chamber. A continuous conveyor belt 412 enters the evaporating chamber 408 through the conveyor belt inlet 428 and exits the evaporating chamber 408 through the conveyor belt outlet 432. Polymer sheets and other polymer structures 404 containing plasticizer may be conveyed into the evaporating chamber 408 for removal of plasticizer via the conveyor belt 412.

The plasticizer removal mechanism includes a duct 436, a heating member 440, a fan 444 and a condenser 448. The duct 436 communicates with and extends between the air inlet 420 and the air outlet 424 of the evaporator chamber 408. The fan 444 is mounted within the duct on an extension 452 extending from an interior surface 456 of the duct. The fan has an axis 460 (not shown) parallel to a duct axis 464 (not shown) and is rotatable about the fan axis 460. The fan 444 causes circulation of air through the duct 436 and out through the air inlet into the evaporator chamber, and out of the evaporator chamber 408 through the air outlet 424 in a continuous cycle.

The heating member 444 is also mounted within the duct 436. The heating member is arranged with respect to the fan 444 so that air returning from the evaporator chamber 408 is heated by the heating member 444 and returned to the evaporator chamber 408.

The condenser 448 is also mounted in the duct 436. The condenser 448 may be a heat exchanger of any type known in the art and is coolable to a predetermined temperature. Preferably, the condenser is a cooling coil 460 mounted in the duct 436 and arranged with respect to the fan 444 so that plasticizer-enriched air drawn from the evaporation chamber 408 passes the condenser 448, causing condensation of the plasticizer on the condenser 448. The plasticizer may then be collected and removed from the apparatus 400. The air from which the plasticizer vapor has been removed continues through the duct 436, past the fan 444, is heated by the heating member 440 and is recycled through the apparatus 400.

For forced air convection extraction of plasticizer from polymer structures containing plasticizer, the most important parameters are temperature and air flow or turbulence. Generally, the higher the temperature, the faster the extraction. However, care must be taken to not heat the polymer structure to a temperature which causes the polymer structure to melt or otherwise be damaged. Accordingly, with respect to methods for extracting plasticizer by forced air convection, the predetermined temperature for a given polymer structure is the temperature at which plasticizer extraction is enhanced at a given air flow or speed without causing damage to the polymer structure. The flow of air across the polymer structure surface must provide sufficient turbulence to cause rapid removal of plasticizer molecules from the surface of the polymer structures and to prevent the formation of boundary layers containing elevated concentrations plasticizer vapor.

EXAMPLE 1

Removal of Plasticizer from Composite Separator Electrode by Vacuum Extraction Coupled with Conductive Heat Transfer.

The apparatus shown in FIG. 1 was utilized to extract plasticizer from a composite separator electrode produced as described in the Detailed Description. Test samples of composite separator electrodes were prepared by making circular cut-outs with the standard hole punch. Punch diameters and cut-out areas were determined for each sample. Since the composite separator electrodes were not of uniform thickness, the area of the cut-out was used to calculate weight per unit area of the sample.

The samples were placed in holding assemblies comprised of different layers of materials and incubated within the apparatus. The different holding assemblies tested included thin strips of aluminum with adhesive backed foam, wire mesh screens, metal wool, and felt. The pressure within the apparatus was reduced by vacuum to 29.5 inches of mercury. Extractions were conducted at 210° and 230° Fahrenheit. Residence time within the apparatus varied.

Figure 5:
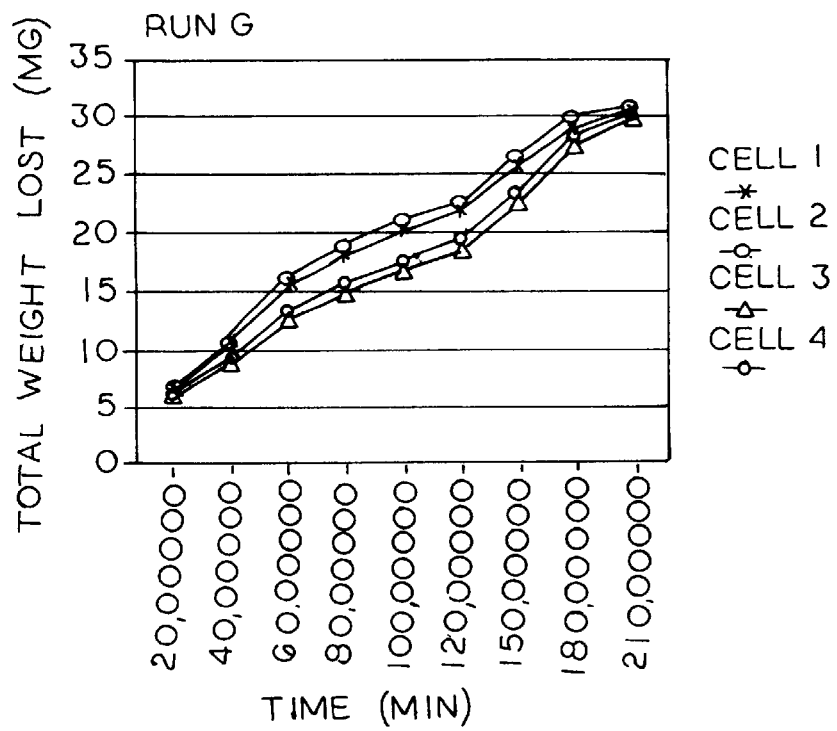
FIG. 5 is a graph plotting total plasticizer removed by weight as a function of time utilizing the apparatus illustrated in FIG. 1.
Figure 6:
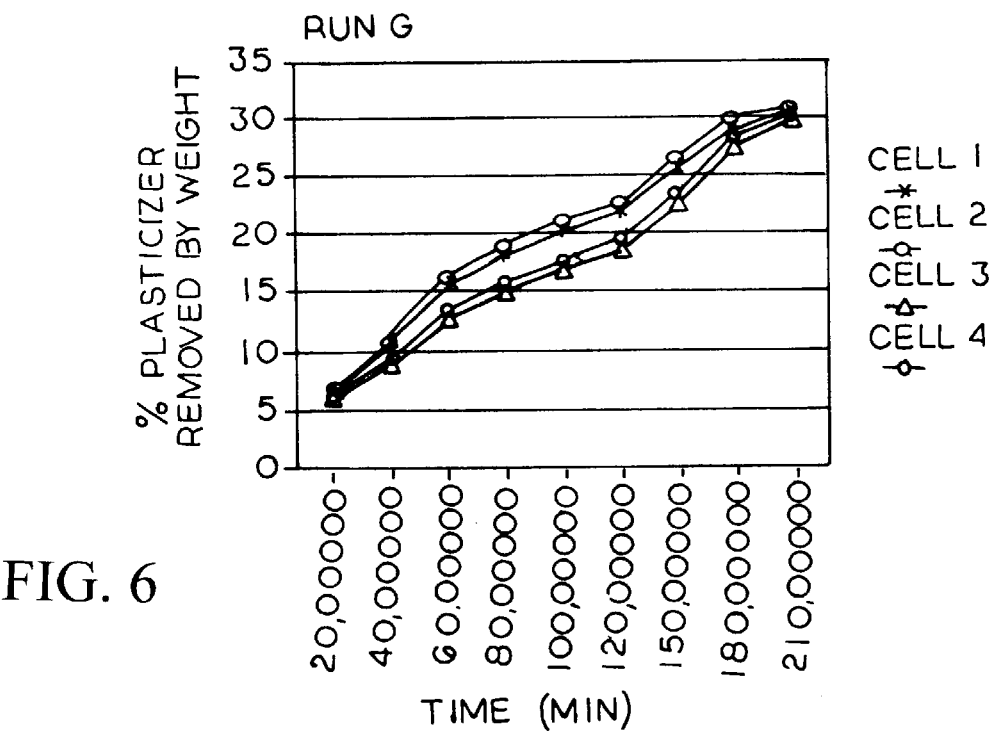
FIG. 6 is a graph plotting percentage plasticizer removed by weight as a function of time utilizing the apparatus illustrated in FIG. 1.

Either dry ice or cold water was utilized in the cooling chamber to lower the temperature of the vacuum chamber walls to approximately 100° Fahrenheit and 34° Fahrenheit, respectively. After extraction, the total weight lost in mg and percent plasticizer removed by weight for each sample is calculated. This data was plotted against residence time within the apparatus. The data is presented in FIGS. 5 and 6.

In general, higher temperatures resulted in faster rates of extraction. Rates of extraction utilizing this method are far superior to either liquid washing methods described in the prior art. Care must be taken, however, that the temperature applied is not so high as to damage the composite separator electrode. The arrangement of the composite separator electrodes within the apparatus effected extraction rates. Samples arranged in a single row exhibited a much more uniform extraction than in multiple row set-ups. Faster extraction rates were observed for samples at the ends of the holding devices.

The most successful holding assembly was configured as follows: a thin metal shim, a porous material, either metal felt or foam, screen, the composite separator electrode, screen, porous material, either metal felt or foam, followed by a thin metal shim. The use of screen material, whether metallic or not, between the porous material and the cell increase rate of extraction. The porous media, whether foam or metallic felt, showed a marked decrease in efficiency after two uses. This manifested itself in a slowed or even reversed extraction rate. In fact, vaporized plasticizer was actually infused into the cell rather than removed. This problem necessitated the use of heat to remove plasticizer from the porous media between uses.

Chamber wall temperature had little effect on extraction rate. Orientation of the composite separator electrodes into vertical or horizontal rows also had no significant effect on extraction rate.

EXAMPLE 2
Extraction of Plasticizer from Polymer by Vacuum Extraction Combined with Radiative Heat Transfer and Natural Convection.

Figure 7:
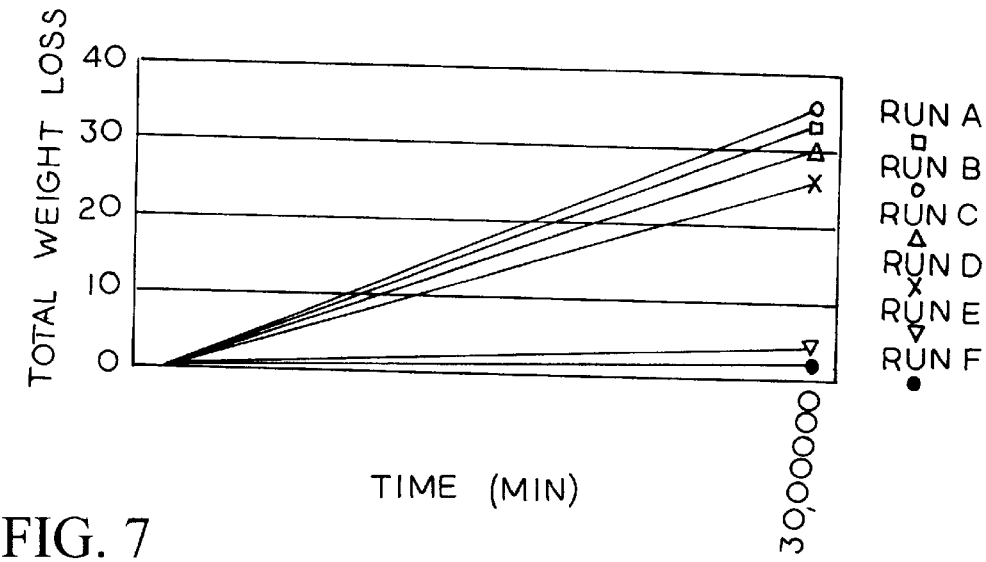
FIG. 7 is a graph plotting total plasticizer removed by weight as a function of time utilizing the apparatus illustrated in FIG. 2.
Figure 8:
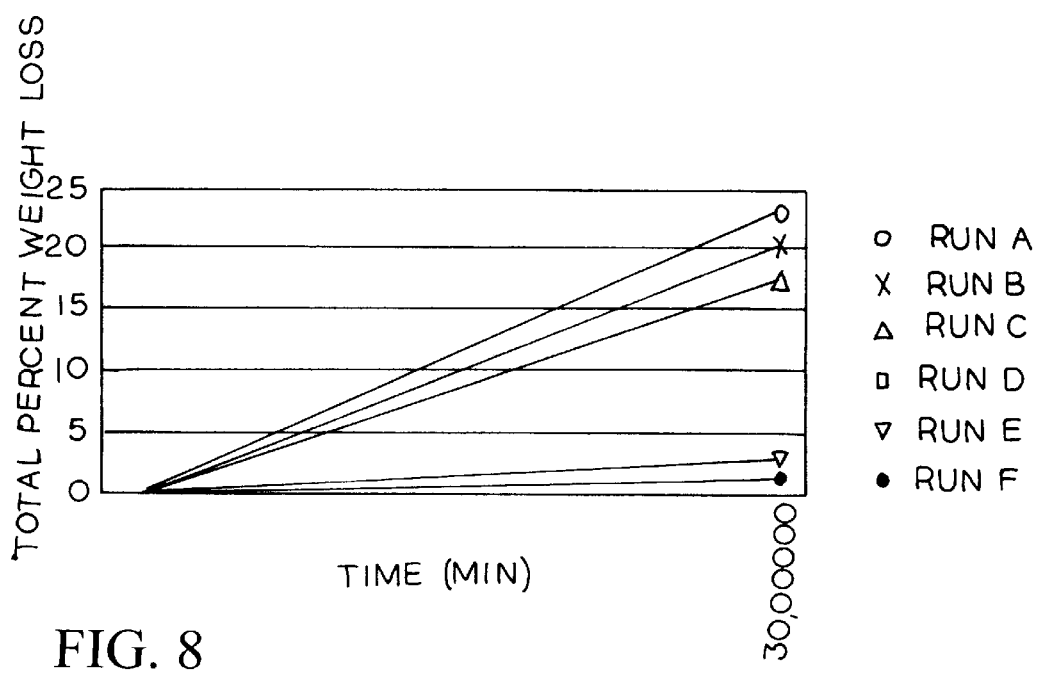
FIG. 8 is a graph plotting percentage plasticizer removed by weight as a function of time utilizing the apparatus illustrated in FIG. 2.

The apparatus described in FIG. 2 is utilized to extract plasticizer from composite separator electrodes containing plasticizer. As with the extraction described in Example 1, the decreased chamber pressure facilitates evaporation at a lower temperature than would be possible at normal atmospheric pressure. Test samples were prepared as described in Example 1. The samples were placed on a wire mesh rack contained within the vacuum chamber. The temperature of the sample was monitored by an infrared probe, connected to the heat source. This allowed the intensity of the radiative heat source to be adjusted to ensure constant sample temperature. The heat emitted, vacuum tank wall temperature, and vacuum pressure were maintained or changed via a feedback loop. All tests were conducted at a vacuum pressure of 29.5 inches of mercury. Correct infrared probe readings were determined by setting probe emissivity in accordance with results comparison of direct contact cell temperature measurement compared to measurement by the infrared probe. Once emissivity for a given cell temperature was determined, the infrared probe was accurate in that range. Tests were done at various test temperatures and emissivity recorded for that temperature such that the infrared probe temperature matched direct contact measurement. All tests were conducted at 30-minute time period. The highest cell temperature without damage was at 260° Fahrenheit. Extraction temperature was then decreased and extraction recorded for 30-minute intervals. The vacuum chamber wall temperature was held at 35° Fahrenheit for all tests. Cell holding screens were purged of plasticizer with a torch between tests. The data is expressed as total weight lost plotted against time and percent plasticizer removed by weight plotted against time in FIGS. 7 and 8, respectively. Run A was conducted at 260° Fahrenheit, Run B at 240° Fahrenheit, Run C at 220° Fahrenheit, Run D at 200° Fahrenheit, Run E at 180° Fahrenheit, and Run F at 150° Fahrenheit.

The test results were consistent with the results in Example 1. Under greatly reduced atmospheric pressure within the extraction chamber was found that at temperatures at and below 210° Fahrenheit there was little if any extraction. The extractor's vacuum pressure was about ½ P.S.I. lower than the pressure attained in Example 1. Therefore, it follows that there would be little or no extraction occurring below 210° Fahrenheit. Above 210° Fahrenheit, the rate of extraction increased as temperature increased. The extraction rates absorbed with this apparatus were much faster than the ether wash method.

EXAMPLE 3
Extraction of Plasticizer from Polymer by Forced Convection Coupled with Radiative Heat Transfer.

Figure 9:
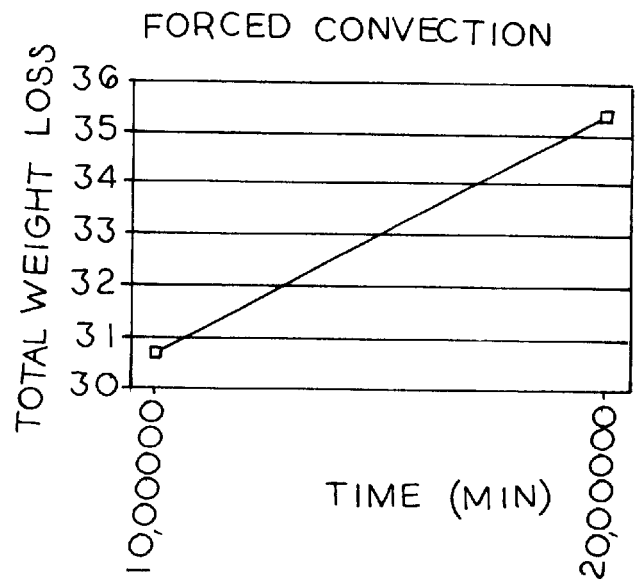
FIG. 9 is a graph plotting total plasticizer removed by weight as a function of time utilizing the apparatus illustrated in FIG. 3.
Figure 10:
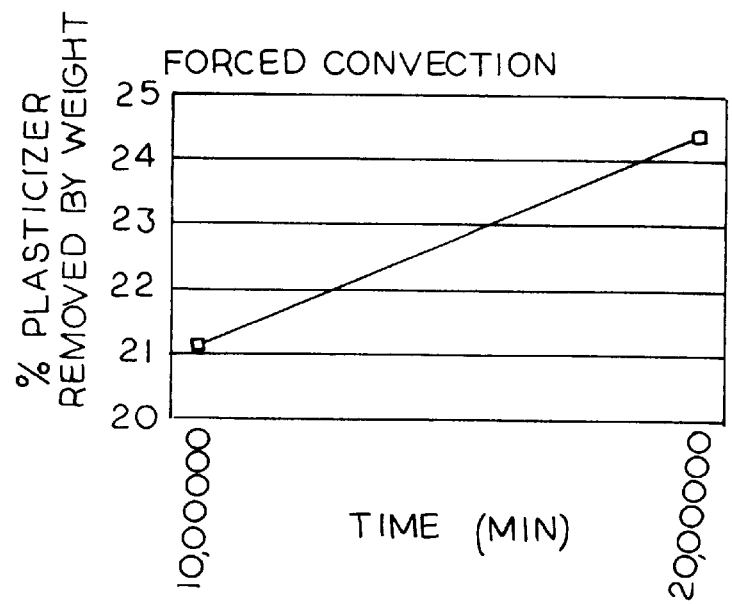
FIG. 10 is a graph plotting percentage plasticizer removed by weight as a function of time utilizing the apparatus illustrated in FIG. 3.

The apparatus illustrated in FIG. 3 was utilized to extract plasticizer from a composite separator electrode sample by radiative heat transfer and forced air convection. Composite separator electrode samples were prepared as described above. Samples were placed on a wire mesh mounted within the apparatus and heated with constant air flow for 10 or 20 minutes. The results are summarized in FIGS. 9 and 10, which plot total weight lost against time and percent plasticizer removed by weight against time, respectively. The rate of extraction of plasticizer was much faster than times reported for ether wash methods.

Extraction of plasticizer was observed to be a function of heat and turbulence. In general, the temperature should be greater than about 140° to 150° Fahrenheit. This temperature is sufficient to promote rapid extraction of plasticizer from the sample while avoiding heat-related damage to the sample. Preferably, a turbulent air flow must be maintained at the surface of the sample.

Finally, the composition of the wire mesh which supports the samples exerts a great influence on the extraction process. Preferably, the sample is arranged between two pieces of wire mesh. The thicker the gauge of the wire, the better the extraction, unless the spaces between the wires are such that they clog with liquid phase plasticizer. Common window screen appears to be the best supporter.

EXAMPLE 4
Plasticizer Extraction from a Composite Separator Electrode Sample Utilizing Forced Convective Heat Transfer.

Figure 11:
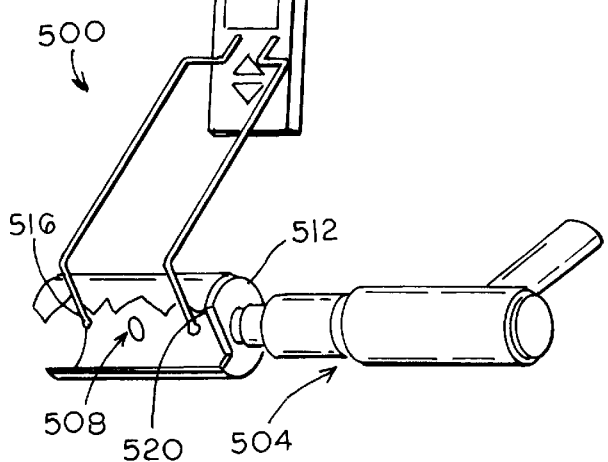
FIG. 11 is a schematic drawing of an apparatus for removing plasticizer from a polymer by forced air convection.

A simple device was constructed to determine parameters for plasticizer extraction by forced air convective heat transfer. This device 500 is illustrated in FIG. 11. Briefly, the device 500 comprises a heat gun 504 of a type known in the art capable of blowing air across a test polymer structure 508 at a desired temperature and velocity. The heat gun communicates with a cylindrical chamber 512 which includes a platform 516 (not shown) to support the polymer structure 508. Temperature was measured within the device 500 by resistive temperature detectors 516 and 520 placed in the air stream. The amount of air flow was monitored by an annometer.

Figure 12:
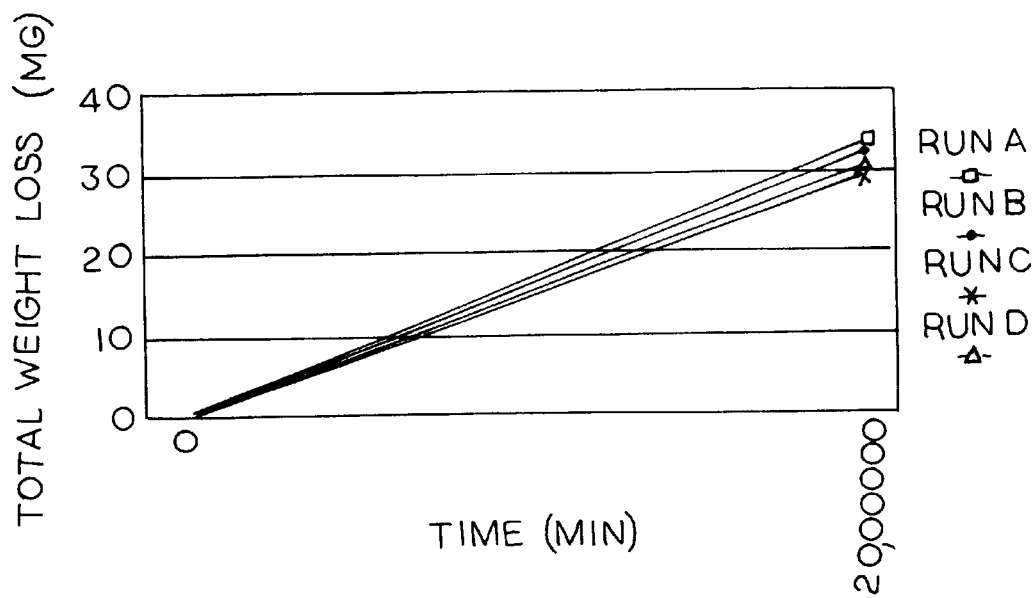
FIG. 12 is a graph plotting total plasticizer removed by weight as a function of time utilizing the apparatus illustrated in FIG. 11.
Figure 13:
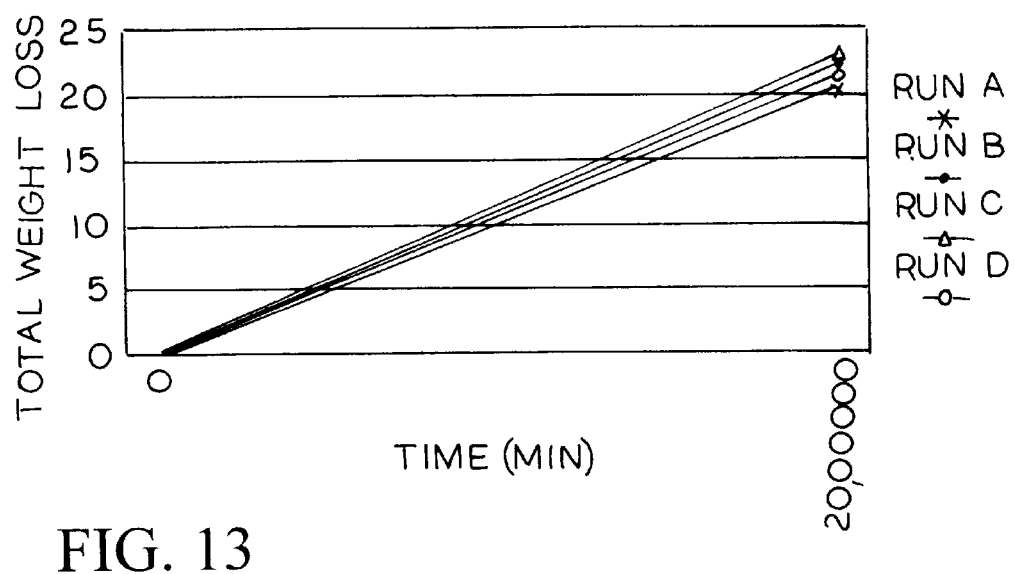
FIG. 13 is a graph plotting percentage plasticizer removed by weight as a function of time utilizing the apparatus illustrated in FIG. 11.

Composite separator electrode samples were prepared as described above. The samples were placed on a wire mesh mounted in the cylinder and then exposed to a constant temperature of approximately 260° Fahrenheit with varying air speed. Results are expressed as total weight loss plotted against time and total percent weight loss plotted against time in FIGS. 12 and 13, respectively. The air speed in Run A was 1.9 M.P.H., Run B was 1.5 M.P.H., Run C was 1.3 M.P.H., and Run D was approximately zero.

The extraction rate was largely independent of air speed. Therefore, all that is required is that the air be moving, even if only slowly, across the surface of the test cell. Although natural convection extraction does occur, the process is too slow to be compared with the forced convection test.

Figure 14:
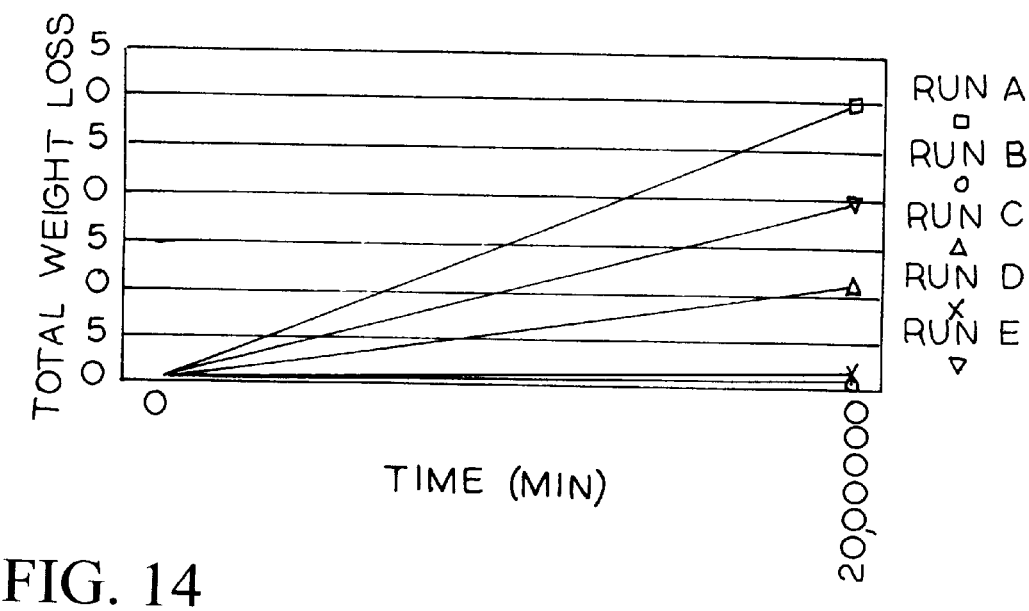
FIG. 14 is a graph plotting total plasticizer removed by weight as a function of time utilizing the apparatus illustrated in FIG. 11.
Figure 15:
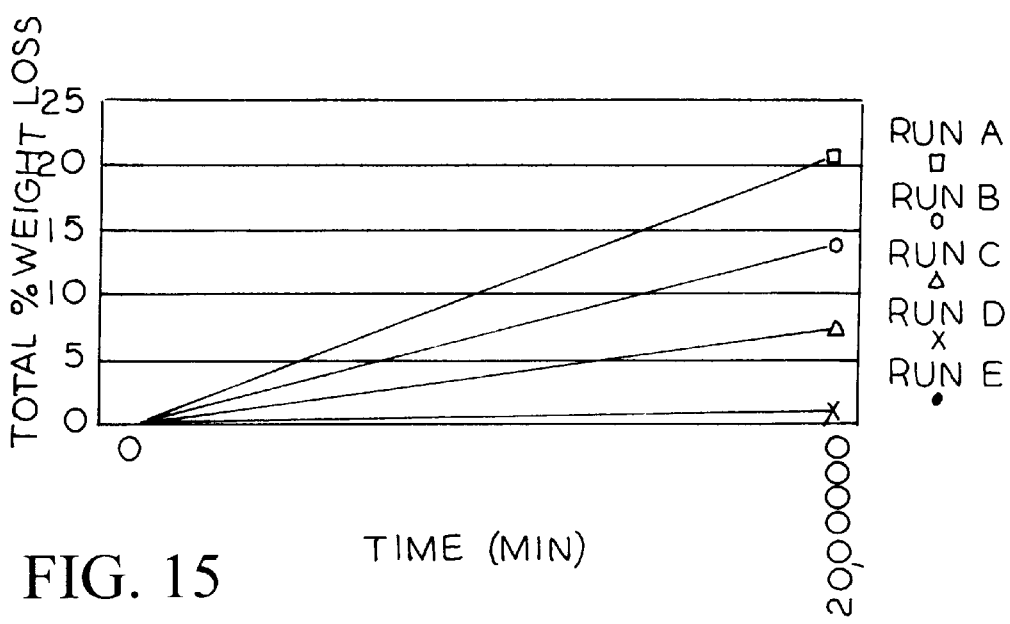
FIG. 15 is a graph plotting percentage plasticizer removed by weight as a function of time utilizing the apparatus illustrated in FIG. 11.

The effect of varying temperature as air speed was held constant was also measured. The results are expressed as total weight loss against time and total percent weight loss against time in FIGS. 14 and 15, respectively. In Run A the temperature was 260° Fahrenheit, in Run B 220° fahrenheit, in Run C 180° Fahrenheit, Run D 120° Fahrenheit, and in Run E 90° Fahrenheit.

These results demonstrate that the higher the temperature, the faster the extraction rate. This is probably due to the higher energy, higher temperature, plasticizer molecules escaping the cell more easily due to increased evaporation rate. Boundary layer effects, that will predominate under other conditions, are minimized by the heated air blowing directly onto the cell perpendicular to the test sample surface. The impulse and momentum of the blowing air molecules acts to disrupt the formation of any would-be boundary layers that might develop between the surface of the cell and the heated air moving over it. The openings in the window screen holding the test cell were chosen to allow very free passage of moving air when the screens and cells were placed perpendicular to the air flow from the heat gun. It was noted in early tests that if the sample and the screens holding it were placed parallel to the air flow, a very low extraction rate resulted. This is most likely due to the formation of a boundary layer just over the sample's surface and in the volumes within the holes of the screen holding the test cell. The lack of impulse and momentum of the heated air molecules resulted in development of a boundary layer of vaporized plasticizer over the cell surface. This boundary layer of increased plasticizer concentration above the test cell may have inhibited extraction.

What is claimed is:

1. An apparatus for removing plasticizer from a polymer sheet, the apparatus comprising:

a cylindrical chamber having an axis, an inner surface, and an outer surface;

a heating member, the heating member mounted in the cylindrical chamber parallel to the chamber axis, the heating member including two side members and a bottom member defining a rectangular slot for containing the polymer sheet, the heating member being heatable to a predetermined temperature;

a cooling chamber for containing a coolant, the cooling chamber surrounding and enclosing the cylindrical chamber so that the coolant contacts the outer surface of the cylindrical chamber and causes cooling the inner surface of the cylindrical chamber to cooled;

a spigot communicating with the cylindrical chamber; and a vacuum, the vacuum connected to the cylindrical chamber so that the cylindrical chamber may be depressurized and so that the combination of heat and reduced pressure causes the vaporization of the plasticizer from the polymer sheet, the vaporized plasticizer then condensing on the cooled inner surface of the cylindrical chamber and removed via the spigot.

2. An apparatus for removing plasticizer from a polymer structure, the apparatus comprising:

an elongate chamber having an inner surface and an outer surface;

a radiant heating member, the heating member mounted in the chamber so that the surface of the polymer sheet may be heated;

a cooling coil, the cooling coil surrounding the chamber and contacting the outer surface of the chamber, so that the outer surface and inner surface of the chamber may be cooled to a predetermined temperature;

a spigot communicating with the cylindrical chamber; and a vacuum, the vacuum connected to the cylindrical chamber so that the chamber may be depressurized, the combination of heat and reduced pressure causing the vaporization of the plasticizer from the polymer structure, the vaporized plasticizer then condensing on the cooled inner surface of the chamber and removable via the spigot.

3. An apparatus for removing plasticizer from a polymer structure, the apparatus comprising:

a cylindrical member, the cylindrical member having an axis, an air inlet opening and an air outlet opening;

at least one radiant heat source mounted in the cylindrical member, so that the polymer structure may be heated to a predetermined temperature; and a fan for providing air flow through the cylindrical member, the fan having an axis coincident with the cylindrical member access, the fan rotatable about the fan axis so that air is drawn from outside the cylindrical member, through the air inlet opening, across the surface of the polymer structure, and exits through the air outlet opening, the combination of heat and air flow causing vaporization and removal of the plasticizer from the polymer sheet.

4. An apparatus for removing plasticizer from a polymer structures, the apparatus comprising:

a vaporizing chamber, the vaporizing chamber including an air inlet, an air outlet, a conveyor inlet opening, and a conveyor outlet opening;

a continuous conveyor belt, the conveyor belt extending through the conveyor inlet opening into the interior of the chamber and extending out of the chamber through the conveyor outlet opening; and a plasticizer removal mechanism, the plasticizer removal mechanism including a duct communicating with the air inlet and the air outlet, the duct having an axis and including a heating member mounted in the duct, a fan mounted in the duct, the fan having an axis parallel to the duct access, the fan rotatable about the fan axis, and a condenser coil, the condenser coil mounted in the duct and being coolable to a predetermined temperature, the heating member, fan, and condenser coil arranged within the duct so that air is forced by the fan through the heating member causing the air to be heated, the air then continuing through the duct into the chamber, the heated air causing vaporization of the plasticizer from polymer structure conveyed into the chamber by conveyer belt, the vaporization forming plasticizer-enriched air, the plasticizer-enriched air exiting the chamber through the air outlet opening into the duct, the plasticizer-enriched air then contacting the condenser coil and the plasticizer condensing on the condenser coil to remove the plasticizer from the plasticizer-enriched air, the air then recycled by the fan through the heating coil and continuing another cycle.

5. A method of removing plasticizer of a particular boiling point from a polymer structure containing plasticizer, the method comprising heating the polymer structure containing plasticizer to a predetermined temperature and vaporizing the plasticizer by applying a vacuum of sufficient pressure so that the boiling point of the plasticizer is reduced below the predetermined temperature.

6. The method of claim 5 wherein the predetermined temperature is greater than about 210 degrees Fahrenheit.

7. The method of claim 5 wherein said vacuum is greater than about 27 inches of mercury.

8. A method of removing plasticizer from a polymer structure containing plasticizer, the method comprising heating the polymer to a predetermined temperature and exposing the polymer to a flow of air, so that the plasticizer evaporates from surfaces of the polymer.

9. The method of claim 8 wherein the predetermined temperature is about less than 150 degrees Fahrenheit.

10. The method of claim 8 wherein the air flow is about greater than 0.2 miles per hour.

11. The method of claim 8 wherein the air flow is sufficient to cause evaporation of plasticizer from the polymer surfaces.

12. A method of removing plasticizer from a polymer structure containing plasticizer, the method comprising exposing surfaces of the polymer structure to a flow of heated air so that the polymer is heated to a predetermined temperature and so that the plasticizer evaporates from the polymer surfaces.

13. The method of claim 12 wherein the predetermined temperature is about less than 150 degrees Fahrenheit.

14. The method of claim 12 wherein the air flow is about greater than 0.2 miles per hour.

15. The method of claim 12 wherein the air flow is sufficient to cause evaporation of plasticizer from the polymer surfaces.

* * * * *